(12) United States Patent
Serebrin et al.

(10) Patent No.: US 9,058,415 B1
(45) Date of Patent: Jun. 16, 2015

(54) COUNTING EVENTS USING HARDWARE PERFORMANCE COUNTERS AND ANNOTATED INSTRUCTIONS

(71) Applicant: Google Inc., Mountain View, CA (US)

(72) Inventors: Benjamin C. Serebrin, Sunnyvale, CA (US); Kim Hazelwood, Cupertino, CA (US)

(73) Assignee: Google Inc., Mountain View, CA (US)

( * ) Notice: Subject to any disclaimer, the term of this patent is extended or adjusted under 35 U.S.C. 154(b) by 121 days.

(21) Appl. No.: 13/839,272

(22) Filed: Mar. 15, 2013

(51) Int. Cl.
*G06F 9/44* (2006.01)
*G06F 11/34* (2006.01)
*G06F 11/36* (2006.01)
*G06F 11/30* (2006.01)

(52) U.S. Cl.
CPC ........ *G06F 11/3409* (2013.01); *G06F 11/3636* (2013.01); *G06F 11/30* (2013.01); *G06F 2201/88* (2013.01)

(58) Field of Classification Search
CPC .. G06F 11/30; G06F 11/3636; G06F 2201/88
USPC ....................... 717/127, 130–131; 714/37, 39
See application file for complete search history.

(56) References Cited

U.S. PATENT DOCUMENTS

| | | | | |
|---|---|---|---|---|
| 6,094,729 A * | 7/2000 | Mann | ............................. | 714/25 |
| 7,844,954 B2 * | 11/2010 | Venkitachalam et al. | .... | 717/130 |
| 8,387,022 B2 * | 2/2013 | Horning et al. | ............... | 717/127 |
| 8,402,256 B2 * | 3/2013 | Arakawa | ....................... | 712/226 |
| 2004/0123084 A1 * | 6/2004 | DeWitt et al. | ................. | 712/227 |
| 2007/0260849 A1 * | 11/2007 | Chen et al. | ...................... | 712/34 |
| 2007/0261034 A1 * | 11/2007 | Chen et al. | ..................... | 717/130 |
| 2009/0064096 A1 * | 3/2009 | Goebel | ........................ | 717/106 |
| 2009/0119493 A1 * | 5/2009 | Venkitachalam et al. | .... | 712/238 |
| 2009/0249049 A1 * | 10/2009 | Weissman et al. | ............ | 712/238 |
| 2012/0227045 A1 | 9/2012 | Knauth et al. | | |

OTHER PUBLICATIONS

Bandyopadhyay, Shibdas "A Study on Performance Monitoring Counters in x86-Architecture" Roll No. MTC0414, M. Tech CS1st Year, Indian Statistical Institute, 2004, 43 pages.

* cited by examiner

Primary Examiner — Ryan Coyer
(74) Attorney, Agent, or Firm — Fish & Richardson P.C.

(57) ABSTRACT

Methods, systems, and apparatus, including computer programs encoded on computer storage media, for receiving a plurality of instructions, where the plurality of instructions comprise one or more first instructions from an application and one or more second instructions from a profiler that instruments the application with the one or more second instructions; identifying, for each of one or more instructions in the plurality of instructions, a respective prefix from one or more prefixes based on a category of the respective instruction; annotating each of the one or more instructions with the respective prefix; and for at least one of one or more hardware performance counters, configuring the respective hardware performance counter to count each instruction in the plurality of instructions that is annotated by one or more of the respective prefixes.

32 Claims, 3 Drawing Sheets

COUNTING EVENTS USING HARDWARE PERFORMANCE COUNTERS AND ANNOTATED INSTRUCTIONS

BACKGROUND

This specification relates to hardware performance counters.

Hardware performance counters are registers built into microprocessors to store counts of hardware-related activities. Each counter can be programmed to monitor an event, e.g., retired instructions, cache misses, or elapsed time. Each counter has access to components of the microprocessor, e.g., caches. Developers can rely on the hardware performance counters to conduct performance analysis or debugging.

Another way developers can conduct performance analysis is by the use of binary translators. Binary translators translate input code into a modified and instrumented functionally-equivalent version of the input code and monitor the performance of the modified code as part of a performance analysis process.

SUMMARY

When using binary translators, the additional instructions in the modified code can distort hardware counter values relative to the original, unmodified code. This specification describes technologies for counting events for hardware performance counters and annotated instructions. In some implementations, instructions are annotated and the hardware performance counters are configured to count only original application instructions and not count other instructions based on the annotations or from the binary translator itself.

In general, one innovative aspect of the subject matter described in this specification can be embodied in methods that include the actions of receiving a plurality of instructions, where the plurality of instructions comprise one or more first instructions from an application and one or more second instructions from a profiler that instruments the application with the one or more second instructions; identifying, for each of one or more instructions in the plurality of instructions, a respective prefix from one or more prefixes based on a category of the respective instruction; annotating each of the one or more instructions with the respective prefix; and for at least one of one or more hardware performance counters, configuring the respective hardware performance counter to count each instruction in the plurality of instructions that is annotated by one or more of the respective prefixes.

Implementations can include one or more of the following features. Annotating each of the one or more instructions comprises adding the respective prefix to each of the one or more instructions. Each prefix comprises data defined by standard x86 instruction encoding. The category indicates whether the respective instruction is from the application or from the profiler. The one or more prefixes comprise one or more of the following: a Repeat String Operation (REP) prefix, Repeat String if not zero (REPZ), or one or more segment prefixes. The one or more segment prefixes comprises one or more of the following: a code segment (CS), a data segment (DS), a stack segment (SS), a general purpose segment (FS or GS), or an extra segment (ES). Each instruction has a variable-sized length. Each instruction conforms to an x86 architecture. Configuring the respective hardware performance counter comprises configuring a corresponding model specific register that determines which annotated instructions are counted by the respective hardware performance counter. The respective hardware performance counter is configured to count one or more of the following: retired instructions, cache misses, branch mispredictions, taken branches, or translation lookaside buffer misses. Each hardware performance counter corresponds to a particular prefix and is configured to count only instructions annotated by that prefix. The one or more hardware performance counters comprise at least two counters, and where each of the at least two counters are associated with a different set of prefixes.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination.

The subject matter described in this specification can be implemented in particular embodiments so as to realize one or more of the following advantages. A system can configure hardware performance counters to accurately count events from instrumented code. A binary translator/profiler may thus measure both its own performance impact and the performance of the original code's image in the translated instruction stream. The performance of the translator and the original code can be measured separately. This facilitates a more accurate performance analysis than an analysis that does not distinguish the performance impact of the profiler. By counting events using hardware performance counters instead of using additional software instrumentation, the system reduces overhead during performance analysis. Furthermore, the code is annotated in such a way that the added instrumentation instructions can be ignored and the code can be executed correctly by legacy hardware. Accordingly, special purpose hardware need not be designed to facilitate the features of the subject matter described in this specification.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
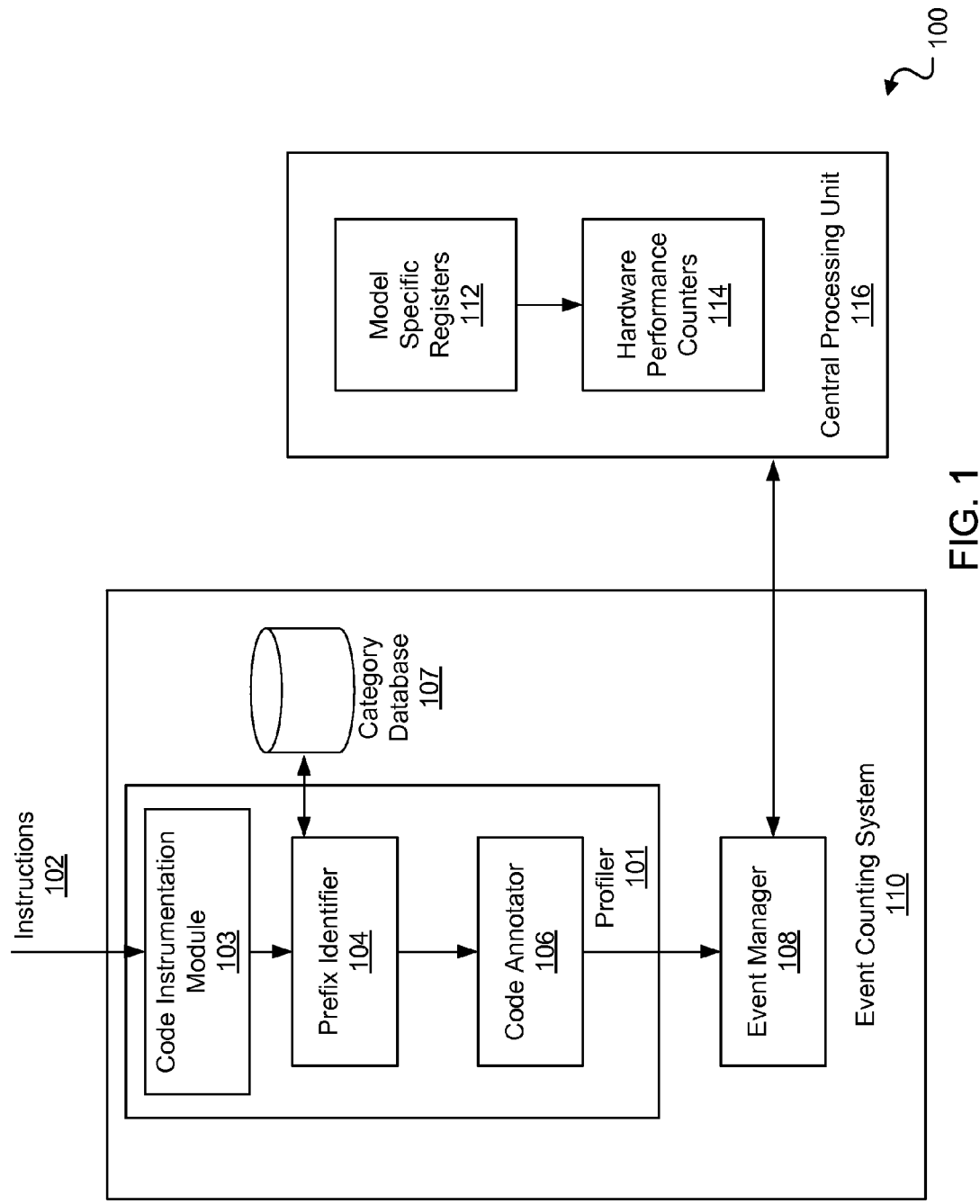
FIG. 1 is a schematic illustration of an example system that counts events using hardware performance counters and annotated instructions.

FIG. 1 is an example architecture 100 and example system 110 that counts events using hardware performance counters and annotated instructions.

The event counting system 110 can be one or more software modules that receives instructions 102. The instructions 102 can be instructions from an application. The event counting system 110 can include a profiler 101. The profiler can process the instructions 102 to output instrumented instructions annotated with prefixes, which will be described further below. The instrumented instructions include instructions from an application and instructions from the profiler 101 that together form a modified version of a set of original instructions prior to instrumentation. The profiler 101, e.g., using a code instrumentation module 103, instruments the application for performance analysis or debugging. The instrumented instructions can be provided to a prefix identifier 104, which will be described further below.

Each instruction can have one or more prefixes that are processed by a central processing unit (CPU) 116. In some implementations, the instructions and their prefixes can be data defined by standard x86 instruction encoding. The standard x86 instruction encoding will be described further below in reference to FIG. 2. Other appropriate prefix schemes can also be used, however.

The prefix identifier 104 in the event counting system 110 identifies prefixes that will be annotated to one or more instructions. The prefixes do not need to be at a particular ordinal position in the instruction. That is, the prefix is data at a location in the instruction. The data can be a "prefix," "infix," "suffix," or other affix. The prefix identifier 104 will be described further below in reference to FIG. 3.

The prefixes can be identified using a category database 107. The category database 107 can associate prefixes with categories. In some implementations, a category indicates a source of the respective instruction. For example, the category can identify whether the respective instruction is from the application or from the profiler. In some other implementations, the category indicates a type of the respective instruction, e.g., a branch or a memory access instruction, in addition to the source of the respective instruction. For example, a REP prefix can be associated with instrumented instructions while no prefix, or a null prefix (0x00), can be associated with non-instrumented instructions. Alternatively, a code segment (CS) prefix, or an extra segment (ES) prefix, can be associated with a non-instrumented instruction, a data segment (DS) prefix can be associated with an instrumented instruction, and a stack segment (SS) prefix can be associated with any instruction. Identifying a prefix based on a category will be described further below.

A code annotator 106 annotates a respective identified prefix to each of the one or more instructions. In some implementations, the code annotator 106 adds the respective identified prefix to each of the one or more instructions. In some other implementations, the code annotator 106 populates, using the respective identified prefix, an existing prefix field in each of the one or more instructions.

In some implementations, the code annotator 106 annotates the instruction with one prefix. In some other implementations, the code annotator 106 annotates the instruction with more than one prefix. An instruction with one prefix can be counted by a corresponding hardware counter, and an instruction with more than one prefix can be counted by more than one hardware counter, as will be described further below.

Based on the identified prefixes, an event manager 108 configures the CPU 116 to accurately count events. In particular, the event manager 108 configures model specific registers 112, which configure how hardware performance counters 114 count events, to determine which of the prefixes or annotated instructions should be counted. This will be described further below in reference to FIG. 3.

In some implementations, the profiler 101 tracks data structures that are updated by the annotated instructions and also tracks hardware performance counters that increment as a result of execution of the annotated instructions.

Figure 2:
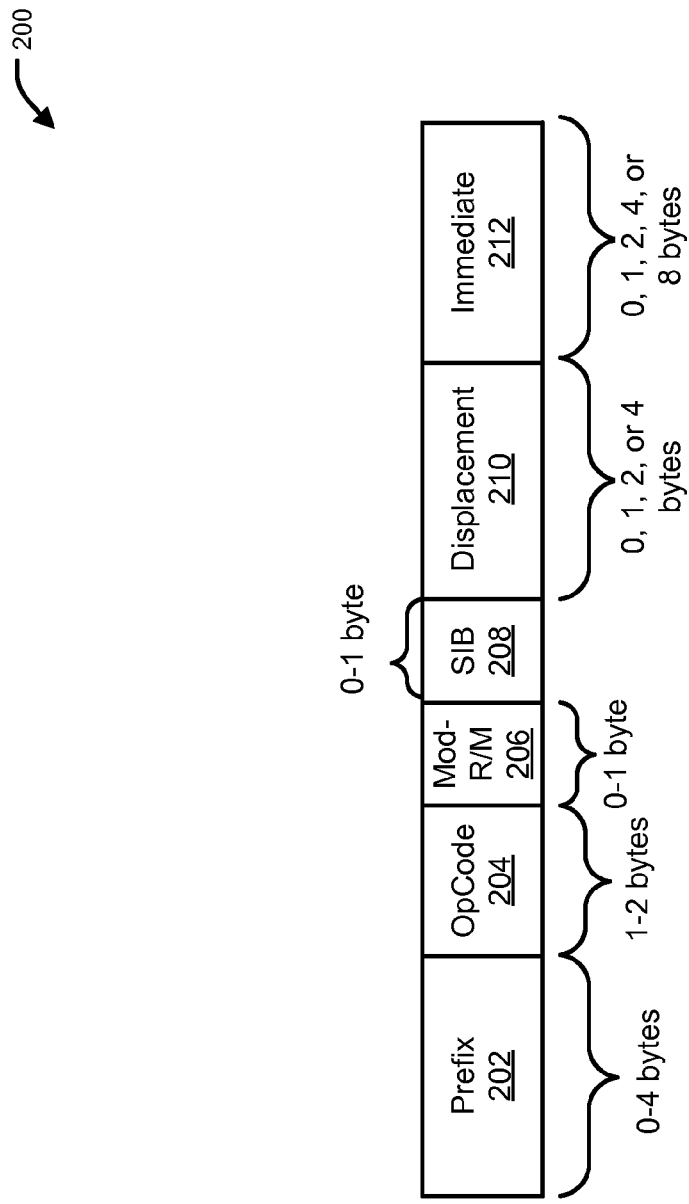
FIG. 2 is an illustration of an example x86 instruction encoding.

One example prefixing scheme is used in the x86 instruction encoding, and example implementations are described in the context of this encoding scheme. In particular, FIG. 2 is an illustration of an example x86 instruction encoding 200. An x86 instruction has a variable-sized length. In particular, the x86 instruction can have an optional prefix 202 that is 0 to 4 bytes long. The instruction has a one or two byte instruction opcode 204. The instruction can have a "mod-r/m" byte 206 that specifies an addressing mode and an optional scaled indexed byte 208 if the instruction uses a scaled indexed memory addressing mode. The instruction can have displacement data 210, which can be 0, 1, 2, or 4 bytes long, or immediate data 212, which can be 0, 1, 2, 4, or 8 bytes long. The displacement data 210 specifies a memory address displacement for the instruction. The immediate data 212 represents an immediate operand for the instruction. In some implementations, instructions are, at most, 15 bytes long.

The prefix 202 can be one or more of the following: a Repeat String Operation (REP) prefix, a Repeat String if not zero (REPZ) or one or more segment prefixes. Segment prefixes can include one or more of the following: a code segment (CS), a data segment (DS), a stack segment (SS), or an extra segment (ES). In some implementations, the segment prefixes can also include general purpose segments FS and GS, which can potentially cause overloading of function. Each of these prefixes is defined by constant data bytes based on standard x86 instruction encoding. For example, a REP prefix is represented in an instruction by a 0xF3 data byte. The CS, SS, DS, and ES segment prefixes are represented by a 0x2E data byte, a 0x36 data byte, a 0x3E data byte, and a 0x26 data byte, respectively.

In some implementations, a hardware performance counter determines an x86 instruction has a prefix by accessing the first 0 to 4 bytes of the instruction. In particular, the hardware performance counter determines the instruction has a prefix if the first 0 to 4 bytes are equivalent to any of the prefix data bytes defined by the x86 instruction encoding.

Figure 3:
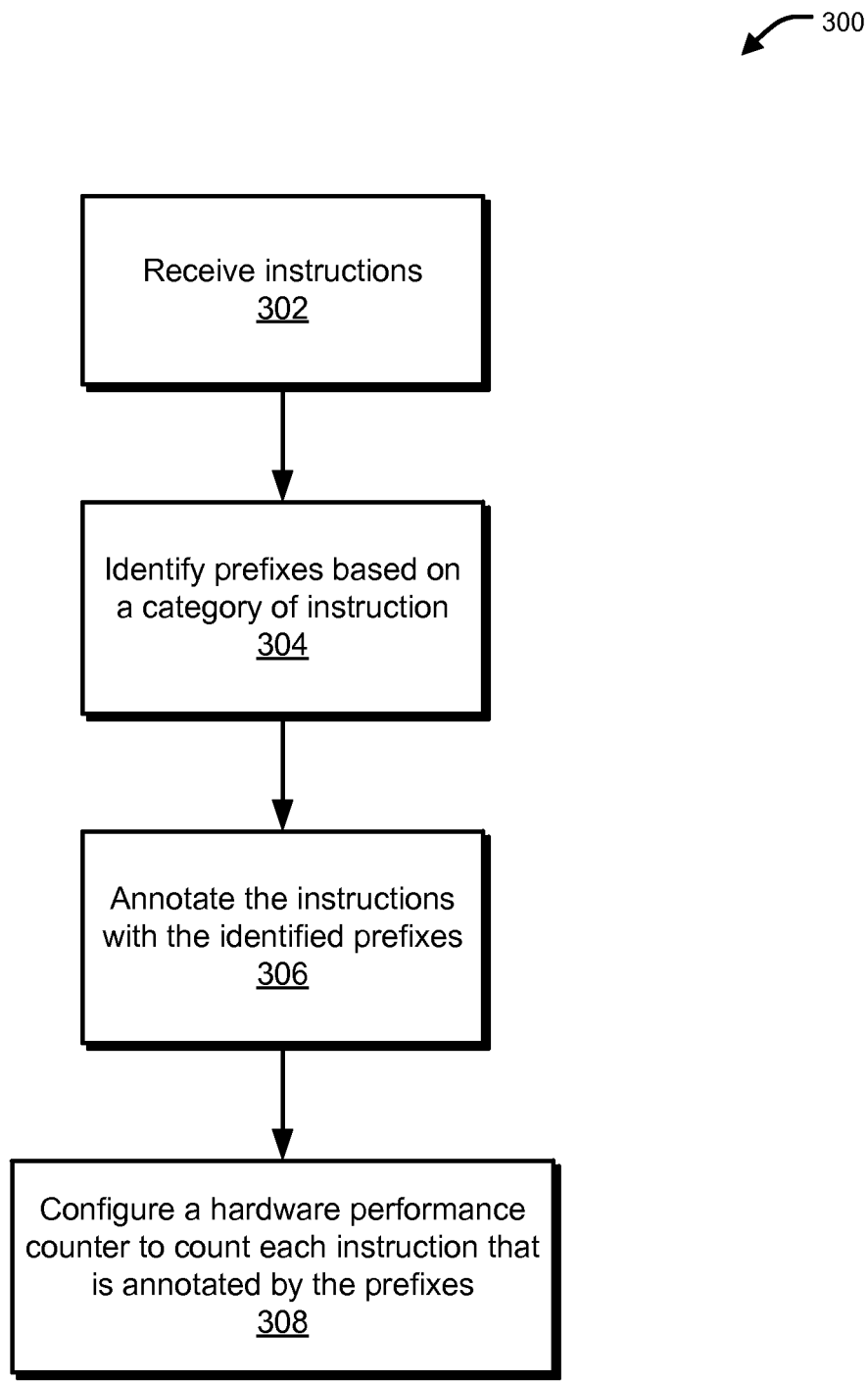
FIG. 3 is a flow chart illustrating an example method of annotating instructions and counting events using hardware performance counters and annotated instructions.

FIG. 3 is a flow chart illustrating an example method of annotating instructions and counting events using hardware performance counters and annotated instructions. For convenience, the method 300 will be described with respect to a system, e.g., a CPU or hardware system, or the event counting system 110 described in reference to FIG. 1, having one or more computing devices that perform the method 300.

The system receives instructions (step 302). The instructions include instructions from an application and instructions from a profiler that instruments the application, as described above in reference to FIG. 1.

In some implementations, the system selects one or more instructions from the instructions to annotate. In some implementations, the system can select only instructions from the application or can select only instructions from the profiler for annotation. In other implementations, the system determines to annotate each instruction regardless of a source of the instruction.

The system identifies, for each of the one or more instructions, prefixes based on a category of the respective instruction (step 304). The association of a prefix and a category can be provided by a category database, the profiler, or another system, e.g., a compiler. As described above, the category can indicate a source of the respective instruction or a type of the respective instruction in addition to the source of the respective instruction.

For example, in some implementations, the system can identify a REP prefix for each instruction that is from the profiler and can identify a null prefix, i.e., no prefix, for each instruction from the application. The hardware counter can count instructions not having the REP prefix while ignoring instructions that have the REP prefix. This is described further below. Some instructions, e.g., a string instruction, can already have a REP prefix as part of the original instruction. In this case, the system can identify and annotate an additional REP prefix to the string instruction, thereby modifying the string instruction to have two REP prefixes.

In some other implementations, the system identifies a distinct segment prefix for each distinct instruction category. For example, the system can identify a CS prefix byte for instructions from the application and a DS prefix byte for instructions from the profiler. Because there are four different segment prefixes in an x86 instruction encoding, instructions can be categorized into eight different categories, e.g., instructions having a CS, DS, ES, SS, GS, SS, REPZ, or REP prefix byte. In some implementations, annotated instructions are still compatible with 32-bit or 64-bit processors.

The system annotates each of the one or more instructions with the respective identified prefix (step 306). This is described above in reference to FIG. 1.

The system configures, for at least one of one or more hardware performance counters, the respective hardware performance counter to count each instruction that is annotated by one or more of the respective prefixes (step 308). At least two hardware performance counters correspond to a different set of prefixes. In some implementations, internal micro-ops of the respective counter are tagged with the one or more respective prefixes. The tagging can be consumed at the retirement of the instruction, e.g., in a re-order buffer. The one or more hardware performance counters can be configured to count retired instructions, cache misses, branch mispredictions, taken branches, and/or translation lookaside buffer (TLB) misses.

In some implementations, each hardware performance counter can correspond to a particular prefix and can be configured to only count instructions having the particular prefix. Such correspondence to particular prefixes creates N counter classes. In particular, the system can configure a corresponding model specific register that determines which instructions are counted by the respective hardware performance counter. For example, a first hardware performance counter can be configured to only count instructions that have a CS prefix byte and a second hardware performance counter can be configured to only count instructions that have a DS prefix byte. Alternatively, the first hardware performance counter can be configured to only count instructions that have one REP prefix byte or two REP prefix bytes if the instruction is a string instruction. The second hardware performance counter can be configured to only count instructions that have no prefix byte.

In some implementations, hardware performance counters can be configured to count instructions having more than one prefix. For example, a third hardware performance counter can be configured to count instructions that have a CS or a DS prefix byte.

The above examples are several ways in which hardware counters can be configured to count. Other appropriate combinations can be used.

After the one or more hardware performance counters are configured, a CPU executes the instructions. Each hardware performance counter counts instructions according to the respective hardware performance counter's configuration. A developer can access each hardware performance counter for performance analysis and debugging.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by data processing apparatus, the method comprising:
   receiving a plurality of instructions of an instrumented application, where the plurality of instructions comprise first instructions from an application and second instructions from a profiler that instruments the application with the second instructions to generate the instrumented application, the instrumented application being a functionally-equivalent version of the application;
   identifying, for each of the instructions in the plurality of instructions, a respective prefix from prefixes based on a category of the respective instruction, wherein at least the second instructions have a respective prefix that is different from the respective prefixes of the first instructions;
   annotating each of the instructions with the respective prefix for the instruction; and
   for at least a first hardware performance counter configuring the first hardware performance counter to count only instructions in the plurality of instructions annotated by one or more respective prefixes for the first instructions, and configuring a second hardware performance counter to count only the instructions in the plurality of instructions that are annotated by the respective prefix for the second instructions.

2. The method of claim 1, where annotating each of the instructions comprises adding the respective prefix to each of the instructions.

3. The method of claim 1, where each prefix comprises data defined by standard x86 instruction encoding.

4. The method of claim 1, where the category indicates whether the respective instruction is from the application or from the profiler.

5. The method of claim 1, where the prefixes comprise one or more of the following: a Repeat String Operation (REP) prefix, Repeat String if not zero (REPZ), or one or more segment prefixes.

6. The method of claim 5, where the one or more segment prefixes comprises one or more of the following: a code segment (CS), a data segment (DS), a stack segment (SS), a general purpose segment (FS or GS), or an extra segment (ES).

7. The method of claim 1, where each instruction has a variable-sized length.

8. The method of claim 1, where each instruction conforms to an x86 architecture.

9. The method of claim 1, where configuring the first and second hardware performance counters comprises configuring respective model specific registers that determines which annotated instructions are counted by the first and second hardware performance counters.

10. The method of claim 1, where the first hardware performance counter is configured to count one or more of the following: retired instructions, cache misses, branch mispredictions, taken branches, or translation lookaside buffer misses.

11. The method of claim 1, where each of the first and second hardware performance counters corresponds to a particular prefix and is configured to count only instructions annotated by that prefix.

12. A system comprising:
   a processor; and
   computer-readable medium coupled to the processor and having instructions stored thereon, which, when executed by the processor, cause the processor to perform operations comprising:
   receiving a plurality of instructions of an instrumented application, where the plurality of instructions comprise first instructions from an application and second instructions from a profiler that instruments the application with the second instructions to generate the instrumented application, the instrumented application being a functionally-equivalent version of the application;
   identifying, for each of the instructions in the plurality of instructions, a respective prefix from prefixes based on a category of the respective instruction, wherein at least the second instructions have a respective prefix that is different from the respective prefixes of the first instructions;
   annotating each of the instructions with the respective prefix for the instruction; and
   for at least a first hardware performance counter, configuring the first hardware performance counter to count only instructions in the plurality of instructions annotated by one or more respective prefixes for the first instructions, and configuring a second hardware performance counter to count only the instructions in the plurality of instructions that are annotated by the respective prefix for the second instructions.

13. The system of claim 12, where annotating each of the instructions comprises adding the respective prefix to each of the one or more instructions.

14. The system of claim 12, where each prefix comprises data defined by standard x86 instruction encoding.

15. The system of claim 12, where the category indicates whether the respective instruction is from the application or from the profiler.

16. The system of claim 12, where the prefixes comprise one or more of the following: a Repeat String Operation (REP) prefix, Repeat String if not zero (REPZ), or one or more segment prefixes.

17. The system of claim 16, where the one or more segment prefixes comprises one or more of the following: a code segment (CS), a data segment (DS), a stack segment (SS), a general purpose segment (FS or GS), or an extra segment (ES).

18. The system of claim 12, where each instruction has a variable-sized length.

19. The system of claim 12, where each instruction conforms to an x86 architecture.

20. The system of claim 12, where configuring the first and second hardware performance counters comprises configuring respective model specific registers that determines which annotated instructions are counted by the first and second hardware performance counters.

21. The method of claim 1, where each of the first and second hardware performance counters corresponds to a particular prefix and is configured to count only instructions annotated by that prefix.

22. A computer-readable medium having instructions stored thereon, which, when executed by a processor, cause the processor to perform operations comprising:
   receiving a plurality of instructions of an instrumented application, where the plurality of instructions comprise first instructions from an application and second instructions from a profiler that instruments the application with the second instructions to generate the instrumented application, the instrumented application being a functionally-equivalent version of the application;
   identifying, for each of the instructions in the plurality of instructions, a respective prefix from prefixes based on a category of the respective instruction, wherein at least the second instructions have a respective prefix that is different from the respective prefixes of the first instructions;
   annotating each of the instructions with the respective prefix for the instruction; and
   for at least a first hardware performance counter configuring the first hardware performance counter to count only instructions in the plurality of instructions annotated by one or more respective prefixes for the first instructions, and configuring a second hardware performance counter to count only the instructions in the plurality of instructions that are annotated by the respective prefix for the second instructions.

23. The computer-readable medium of claim 22, where annotating each of the instructions comprises adding the respective prefix to each of the one or more instructions.

24. The computer-readable medium of claim 22, where each prefix comprises data defined by standard x86 instruction encoding.

25. The computer-readable medium of claim 22, where the category indicates whether the respective instruction is from the application or from the profiler.

26. The computer-readable medium of claim 22, where the prefixes comprise one or more of the following: a Repeat String Operation (REP) prefix, Repeat String if not zero (REPZ), or one or more segment prefixes.

27. The computer-readable medium of claim 26, where the one or more segment prefixes comprises one or more of the following: a code segment (CS), a data segment (DS), a stack segment (SS), a general purpose segment (FS or GS), or an extra segment (ES).

28. The computer-readable medium of claim 22, where each instruction has a variable-sized length.

29. The computer-readable medium of claim 22, where each instruction conforms to an x86 architecture.

30. The computer-readable medium of claim 22, where configuring the first and second hardware performance counters comprises configuring respective model specific registers that determines which annotated instructions are counted by the first and second hardware performance counters.

31. The computer-readable medium of claim 22, The method of claim 1, where the first hardware performance counter is configured to count one or more of the following: retired instructions, cache misses, branch mispredictions, taken branches, or translation lookaside buffer misses.

32. The computer-readable medium of claim 22, where each of the first and second hardware performance counters corresponds to a particular prefix and is configured to count only instructions annotated by that prefix.

* * * * *